(12) United States Patent
Kajiyama et al.

(10) Patent No.: US 11,085,895 B2
(45) Date of Patent: Aug. 10, 2021

(54) ELECTRODE FOR USE IN GAS SENSOR AND GAS SENSOR ELEMENT USING THE SAME

(71) Applicant: DENSO CORPORATION, Kariya (JP)

(72) Inventors: Norikazu Kajiyama, Chiryu (JP); Tadashi Nakamura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 40 days.

(21) Appl. No.: 14/646,914

(22) PCT Filed: Nov. 18, 2013

(86) PCT No.: PCT/JP2013/081061
§ 371 (c)(1),
(2) Date: May 22, 2015

(87) PCT Pub. No.: WO2014/080867
PCT Pub. Date: May 30, 2014

(65) Prior Publication Data
US 2015/0293051 A1 Oct. 15, 2015

(30) Foreign Application Priority Data

Nov. 22, 2012 (JP) .............................. JP2012-256268
Oct. 11, 2013 (JP) .............................. JP2013-213501

(51) Int. Cl.
*G01N 27/407* (2006.01)

(52) U.S. Cl.
CPC ................................ *G01N 27/4075* (2013.01)

(58) Field of Classification Search
CPC ............... G01N 27/403; G01N 27/407-27/41
See application file for complete search history.

(56) References Cited

U.S. PATENT DOCUMENTS 4,940,528 A * 7/1990 Oki ...................... G01N 27/407
204/426
5,716,507 A * 2/1998 Tanaka ............... G01N 27/4075
204/424

(Continued)

FOREIGN PATENT DOCUMENTS

JP      8-166369      6/1996
JP      10-026603      1/1998

(Continued)

OTHER PUBLICATIONS

Machine translation of JP 2013104737 A.*

(Continued)

*Primary Examiner* — Maris R Kessel
*Assistant Examiner* — Joshua L Allen
(74) *Attorney, Agent, or Firm* — Nixon & Vanderhye, PC

(57) ABSTRACT

In a gas sensor element 1 capable of detecting a concentration of a specific gas contained in a measuring target gas, an electrode 12 formed on a solid electrolyte body 11 having an oxygen ion conductivity is made of noble metal and solid electrolyte. The electrode 12 has a noble metal part 121 made of the noble metal, a solid electrolyte part 122 made of the solid electrolyte, and a mixture part 123 made of the noble metal and the solid electrolyte when a cross-sectional surface of the electrode 12 is observed. The mixture part 123 is formed along an interface part 120 between the noble metal part 121 and the solid electrolyte part 122.

13 Claims, 11 Drawing Sheets

(56) References Cited

U.S. PATENT DOCUMENTS

| | | | |
|---|---|---|---|
| 6,420,064 B1 * | 7/2002 | Ghosh | G01N 27/4075 204/282 |
| 2001/0047937 A1 | 12/2001 | Sugiyama et al. | |
| 2003/0116448 A1 | 6/2003 | Nakae et al. | |
| 2005/0016848 A1 * | 1/2005 | Sahimi | G01N 27/4071 204/427 |
| 2007/0095662 A1 * | 5/2007 | Suzuki | G01N 27/4071 204/424 |
| 2009/0050481 A1 * | 2/2009 | Goto | G01N 27/407 204/427 |

FOREIGN PATENT DOCUMENTS

| | | |
|---|---|---|
| JP | 11-014594 | 1/1999 |
| JP | 2003-247972 | 9/2003 |
| JP | 2004-226171 | 8/2004 |
| JP | 2009-257826 | 11/2009 |
| JP | 2013-104737 | 5/2013 |
| JP | 2013104737 A * | 5/2013 |

OTHER PUBLICATIONS

Nanoscale Definition (http://www.dictionary.com/browse/nanoscale), accessed Mar. 2, 2017.*

International Search Report for PCT/JP2013/081061, dated Feb. 18, 2014, 6 pages.

Written Opinion of the ISA for PCT/JP2013/081061, dated Feb. 18, 2014, 5 pages.

International Preliminary Report on Patentability (5 pages) dated Jun. 4, 2015, issued in corresponding Japanese Application No. PCT/JP2013/081061 and English translation (12 pages).

* cited by examiner

PRIOR ART

PRIOR ART

US 11,085,895 B2

ELECTRODE FOR USE IN GAS SENSOR AND GAS SENSOR ELEMENT USING THE SAME

This application is the U.S. national phase of International Application No. PCT/JP2013/081061 filed 18 Nov. 2013 which designated the U.S. and claims priority to JP Patent Application Nos. 2012-256268 filed 22 Nov. 2012, and 2013-213501 filed 11 Oct. 2013, the entire contents of each of which are hereby incorporated by reference.

TECHNICAL FIELD

The present invention relates to electrodes, gas sensor elements equipped with the electrodes, and gas sensors equipped with the gas sensor elements, and in particular, relates to the electrodes formed on a solid electrolyte body arranged in the gas sensor element, the solid electrolyte body having an oxygen ion conductivity and capable of detecting a concentration of a specific gas contained in a measuring target gas.

BACKGROUND ART

There has been known a gas sensor equipped with a gas sensor element. The gas sensor is arranged in an exhaust gas pipe through which exhaust gas emitted from an internal combustion engine mounted to a motor vehicle passes. The gas sensor element is capable of detecting a concentration of a specific gas contained in a measuring target gas. Specifically, for example, there are air/fuel ratio sensors and oxygen sensors which are capable of detecting a concentration of oxygen contained in exhaust gas. For example, there are gas sensor elements equipped with a solid electrolyte body having an oxygen ion conductivity, an electrode formed at a measuring target gas side, and an electrode formed at a reference gas side. These electrodes are formed on the surfaces of the solid electrolyte body.

In the gas sensor element, it is required for the electrode at a measuring target gas side to have an adhesion property and a conductive property to the solid electrolyte body. Patent document 1 discloses an electrode for use in a gas sensor made of platinum and yttria-stabilized zirconia (hereinafter sometimes referred to as the YSZ). The platinum is noble metal having an excellent conductivity, and yttria-stabilized zirconia is a solid electrolyte having an oxygen ion conductivity which are the same material of the solid electrolyte body.

PRIOR ART TECHNICAL DOCUMENT

Patent Document

[Patent document 1] Japanese patent laid open publication No. JP H10-26603.

SUMMARY OF THE INVENTION

Problem to Be Solved By the Invention

On observing a cross-sectional surface of the electrode for use in the conventional gas sensor disclosed in Patent document 1 previously described by using a scanning electron microscope (hereinafter sometimes referred to as the SEM), the cross-sectional surface of the electrode was a noble metal part 921 made of platinum Pt and a solid electrolyte part 922 made of YSZ as solid electrolyte which were clearly separated from to each other by an interface part 920 between them. In this case, a reaction point to generate a reaction of converting molecules (oxygen molecules) in a measuring target gas to ions (oxygen ions) is a three phase interface between the electrode part (Pt), the solid electrolyte part (YSZ) and the measuring target gas (vapor phase).

However, in the electrode having the structure shown in the same drawings, the three phase interface as the reaction point previously described is present only in the interface part 920 between the noble metal part 921 and the solid electrolyte part 922. It cannot be said that a sufficient three phase interface is present. That is, this provides insufficient efficiency in converting molecules (oxygen molecules) contained in the measuring target gas to ions (oxygen ions). This increases an electrode resistance (electrode interface resistance), and there is a possible variation of the sensor output. FIG. 8 shows an observation (magnification: 30000 times) of part a in FIG. 7 (magnification: 10000 times), FIG. 9 shows an observation (magnification: 30000 times) of part b in FIG. 7 (magnification: 10000 times).

The present invention has been completed with a view to addressing the above issues and has an object to provide an electrode for use in a gas sensor capable of supplying a stable output and a gas sensor element using the electrode.

Means For Solving the Above Problems

In accordance with one aspect of the present invention, there is provided an electrode for use in a gas sensor equipped with a gas sensor element. The gas sensor element is capable of detecting a concentration of a specific gas contained in a measuring target gas. The gas sensor element has a solid electrolyte body having an oxygen ion conductivity on which the electrode is formed. The electrode is made of noble metal and solid electrolyte. A noble metal part, a solid electrolyte part, and a mixture part are formed in a cross-sectional surface of the electrode. The noble metal part is made of the noble metal. The solid electrolyte part is made of the solid electrolyte. The mixture part is made of the noble metal and the solid electrolyte. The mixture part is formed along an interface part between the noble metal part and the solid electrolyte part.

In accordance with another aspect of the present invention, there is provided a gas sensor element having the electrode formed at a measuring target gas side on one surface of the solid electrolyte body having an oxygen ion conductivity, and a reference electrode formed at a reference gas side on the other surface of the solid electrolyte body.

Effects of the Invention

The electrode for use in a gas sensor contains the noble metal and the solid electrolyte, as previously described. When a cross-sectional surface of the electrode is observed, the noble metal part, the solid electrolyte part and the mixture part are formed in the electrode. That is, because the electrode has the mixture part made of the noble metal and the solid electrolyte, it is possible to expand a three phase interface of the noble metal part (noble metal), the solid electrolyte part (solid electrolyte) and a measuring target gas (vapor phase).

It is thereby possible to increase the number of reaction points at which the reaction of converting molecules in the measuring target gas to ions occurs. That is, this makes it possible to enhance the efficiency to convert molecules contained in the measuring target gas to ions. This makes it possible to reduce an electrode resistance (electrode interface resistance), and suppress variation of a sensor output (for example, a limiting current value IL), and to reliably provide a stable sensor output.

Further, the mixture part in the electrode is formed along the interface part between the noble metal part and the solid electrolyte part. This makes it possible to suppress variation of an electrode resistance and a sensor resistance. It is thereby possible to further suppress variation of a sensor output, and to reliably provide a stable sensor output.

The gas sensor element has the solid electrolyte body, an electrode at a measuring target gas side and an electrode at a reference gas side. The electrode at the measuring target gas side is used for a gas sensor. This makes it possible to reduce an electrode resistance of the electrode at the measuring target gas side, and suppress variation of the sensor output. This makes it possible for the gas sensor to output a stable sensor output.

As previously described, it is possible to provide the electrode for use in a gas sensor capable of outputting a stable sensor output, and provide the gas sensor element using the electrode.

EMBODIMENTS TO EXECUTE THE PRESENT INVENTION

Figure 1:
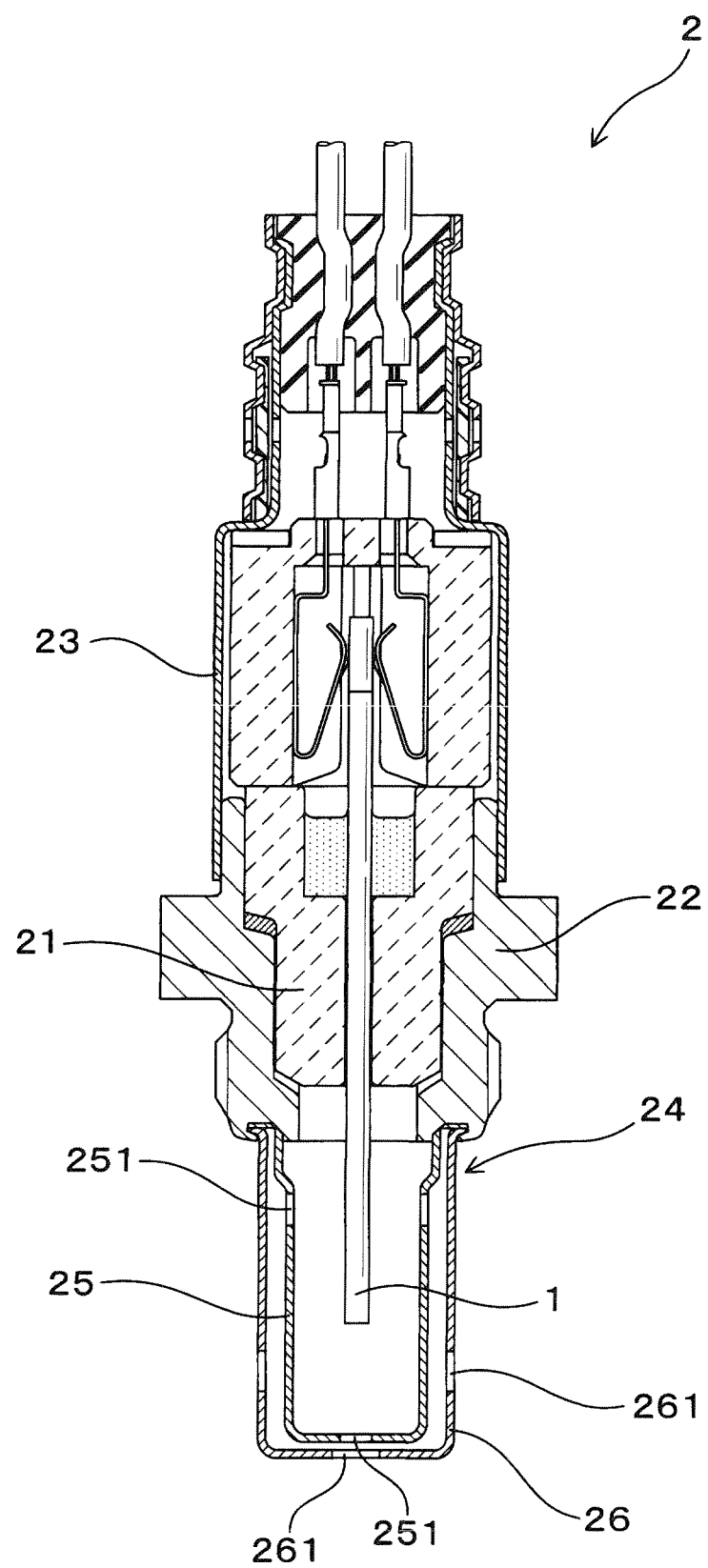
FIG. 1 is a view showing a cross-section which explains an overall structure of a gas sensor according to a first exemplary embodiment.

The electrode for use in a gas sensor previously described can be applied to an air/fuel ratio sensor and an oxygen sensor capable of detecting a concentration of oxygen contained in exhaust gas, a NOx sensor capable of detecting a concentration of NOx contained in exhaust gas, a hydrogen sensor capable of detecting a concentration of hydrogen contained in exhaust gas, etc.

Further, the electrode for use in a gas sensor previously described can be formed on the solid electrolyte body in the gas sensor element previously described. Furthermore, it is preferable that the solid electrolyte body is made of solid electrolyte contained in the electrode for use in a gas sensor. This makes it possible to improve adhesiveness of the electrode for use in a gas sensor to the solid electrolyte body.

Further, the electrode for use in a gas sensor contains the noble metal and the solid electrolyte. For example, it is possible to use, as the noble metal, platinum (Pt), palladium (Pd), rhodium (Rh), gold (Au), etc. It is possible to use, as the solid electrolyte, yttria-stabilized zirconia, partially stabilized zirconia, etc.

Further, the electrode for use in a gas sensor previously described has the noble metal part, the solid electrolyte part and the mixture part when a cross-sectional surface of the electrode is observed. The mixture part is a part in which the noble metal and the solid electrolyte are mixed. Specifically, in the mixture part, the noble metal and the solid electrolyte are mixed and in contact with each other in a three-dimensional nano-scale structure. In the mixture part, at least a part of the noble metal or the solid electrolyte is continuously in contact with micro-scale noble metal (in the noble metal part) or micro-scale solid electrolyte (in the solid electrolyte part) to form a continuous phase. That is, the noble metal and the solid electrolyte in the mixture part form a bicontinuous nano-scale structure. In more detail, the mixture part, in which the noble metal and the solid electrolyte are mixed and in contact with each other in the three-dimensional nano-scale structure. This structure is explained as follows. When a cross-sectional surface of the mixture part is observed, the noble metal and the solid electrolyte are not divided from each other by a single continuous curve in a circle area having a diameter of 200 nm, for example. It is possible to observe a cross-sectional surface of the electrode for use in a gas sensor previously described, by using a scanning electron microscope (SEM), etc., for example.

In addition, when a cross-sectional surface of the mixture part is observed, the mixture part is formed along an interface between the noble metal part and the solid electrolyte part. That is, the mixture part is formed along at least a part of the interface between the noble metal part and the solid electrolyte part. It is preferable for the mixture part to be formed along the overall area of the interface between the noble metal part and the solid electrolyte part.

Furthermore, when a cross-sectional surface of the electrode is observed, it is preferable that the mixture part inside at least a 5 μm×5 μm square is formed along the overall interface between the noble metal part and the solid electrolyte part in the electrode. This structure makes it possible to further suppress variation of an electrode resistance and variation of a sensor resistance. This makes it possible to further suppress variation of the sensor output and provide the stable sensor output.

The mixture part inside a 5 μm×5 μm square formed along the overall interface between the noble metal part and the solid electrolyte part in the electrode is as follows. When a cross-sectional surface of the electrode is observed, at least a 5 μm×5 μm square (5 μm four sides of a square), in which the mixture part is formed along the overall interface between the noble metal part and the solid electrolyte part, is always present in the electrode.

In addition, it is preferable for the mixture part to have a maximum width which is not more than 50 times of a minimum width of the mixture part. This case makes it possible to suppress variation of a width of the mixture part. That is, it is possible to make the mixture part uniform in the interface between the noble metal part and the solid electrolyte part. This makes it possible to further suppress variation of the electrode resistance and variation of the sensor resistance, and obtain a stable sensor output.

When the maximum width of the mixture part exceeds 50 times of the minimum width of the mixture part, there is a possible case of not adequately suppressing variation of the width of the mixture part. Further, there is a possible case of not adequately suppressing variation of the electrode resistance, and further not adequately suppressing variation of the sensor resistance.

When a cross-sectional surface of the electrode for use in a gas sensor is observed, it is preferable that at least one selected from the noble metal part and the solid electrolyte part is present, i.e. formed in a circle area having a diameter of 1 μm which contains the mixture part. This case makes it possible to reduce an electrode capacitance of the electrode and enhance the response to the target gas. Further, it is possible to increase a detection accuracy of detecting imbalance between cylinders (variation in an air/fuel ratio between cylinders) of an internal combustion engine by enhancing the response to the target gas.

The structure in which at least one selected from the noble metal part and the solid electrolyte part is present, i.e. formed in a circle area having a diameter of 1 μm which contains the mixture part is as follows. When a cross-sectional surface of the electrode is observed, there is no area having a diameter of 1 μm which is made only of the mixture part in the electrode.

When no noble metal part and no solid electrolyte part are present in the circle area having a diameter of 1 μm which contains the mixture part, i.e. when the mixture part is only present in the circle area having a diameter of 1 μm, the electrode capacitance of the electrode increases, and there is a possible case of reducing the response to the target gas. Further, there is a possible case of reducing a detection accuracy of detecting imbalance between cylinders of an internal combustion engine.

It is possible for the solid electrolyte to have an oxygen ion conductivity. This case makes it possible to enhance the efficiency of converting oxygen molecules contained in a measuring target gas to oxygen ions.

Further, it is possible that the noble metal is a platinum, and the solid electrolyte is yttria-stabilized zirconia. This makes it possible to provide the effects previously described to have a stable sensor output.

The gas sensor element previously described is equipped with at least the solid electrolyte body, the electrode at a measuring target gas side and the electrode at the reference gas side. For example, it is possible to use, as the solid electrolyte body, yttria-stabilized zirconia having an oxygen ion conductivity and partially stabilized zirconia, etc.

It is possible to form the electrode at a measuring target gas side and the electrode at the reference gas side on the solid electrolyte body. For example, it is possible to form the electrode at a measuring target gas side and the electrode at the reference gas side on both surfaces facing to each other of the solid electrolyte body. It is possible to use the electrode at a measuring target gas side as an electrode for use in a gas sensor, and the electrode at the reference gas side as an electrode for use in a gas sensor.

Further, it is acceptable for the gas sensor element previously described to have a porous diffusion resistance layer through which the measuring target gas passes. The electrode at a measuring target gas side is covered with the porous diffusion resistance layer. Still further, in the gas sensor element previously described, it is acceptable to form a catalyst layer and a poisoning trap layer on an outer surface of the porous diffusion resistance layer through which the measuring target gas is introduced. The catalyst layer has supporting particles made of alumina and noble metal particles, for example Pt, Pd, Rh, etc. A porosity of the alumina has been adjusted. The poisoning trap layer captures poisoning components contained in the measuring target gas.

EXEMPLARY EMBODIMENTS

First Exemplary Embodiment

A description will now be given of the electrode for use in a gas sensor and the gas sensor element equipped with the electrode according to a first exemplary embodiment with reference to drawings. The first exemplary embodiment will explain a gas sensor element for use in an air/fuel ratio sensor, and an electrode for use in the gas sensor element of a gas sensor.

A description will now be given of a structure of the gas sensor equipped with the gas sensor element according to the first exemplary embodiment. Through the exemplary embodiments, a front end side indicates one side in an axial direction of the gas sensor, at which the gas sensor element is exposed to the measuring gas. A distal end side indicates an opposite side of the front end side.

As shown in FIG. 1, the gas sensor 2 according to the second exemplary embodiment is equipped with the gas sensor element 1, an insulation glass 21, a housing casing 22, an atmosphere side cover 23 and an element cover 24. The gas sensor element 1 detects a concentration of a specific gas contained in the measuring target gas. The gas sensor element 1 is inserted into the inside of the insulation glass 21 and fixed to the insulation glass 21. The housing casing 22 is inserted into the inside of the insulation glass 21 and supports the insulation glass 21. The atmosphere side cover 23 is arranged at the distal end side of the housing case 22. The element cover 24 is arranged at the front end side of the housing casing 22 in order to protect the gas sensor element 1.

As shown in the same drawing, the element cover 24 has a double structure having an interior cover 25 and an exterior cover 26. A front end part of the gas sensor element 1 is covered with the interior cover 25. The interior cover 25 is covered with the exterior cover 26. A plurality of introduction holes 251 and 261 through which the measuring target gas passes and are provided.

Figure 2:
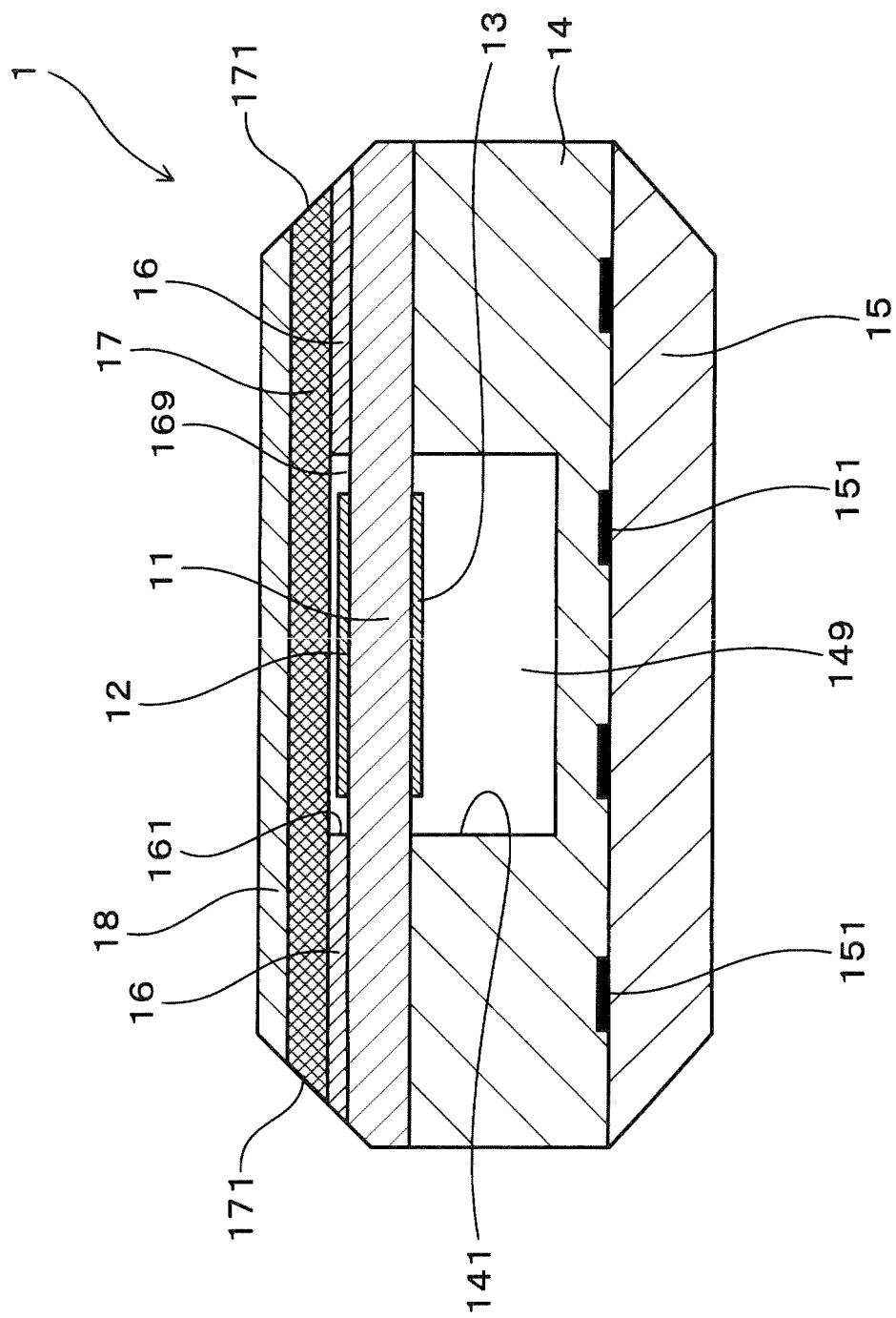
FIG. 2 is a view showing a cross-section which explains a structure of a gas sensor element according to the first exemplary embodiment.

Next, a description will now be given of the gas sensor element 1 according to the first exemplary embodiment. As shown in FIG. 2, the gas sensor element 1 according to the first exemplary embodiment is a gas sensor element for use in an air/fuel ratio sensor capable of detecting an air/fuel ratio (A/F) of a mixture gas to be supplied to an internal combustion engine on the basis of a limiting current. The limiting current flows between the electrodes (the electrode 12 at a measuring target gas and the electrode 13 at a reference gas side which will be explained) depending on a concentration of a specific gas (concentration of oxygen) contained in the measuring target gas.

The gas sensor element 1 has a solid electrolyte body 11 having an oxygen ion conductivity made of yttria-stabilized zirconia (YSZ). The solid electrolyte body 11 has a plate shape. The electrode 12 at the measuring target gas side is formed on one surface of the solid electrolyte body 11. The electrode 13 at a reference gas side is formed at the other surface of the solid electrolyte body 11.

As shown in FIG. 2, a reference gas chamber formation layer 14 is formed at the electrode 13 of the reference gas side on the solid electrolyte body 11. A groove part 141 is formed in the reference gas chamber formation layer 14. The groove part 141 forms a reference gas chamber 149. The reference gas chamber 149 is configured to introduce a reference gas therein.

A heater substrate 15 is formed on the surface of the reference gas chamber formation layer 14, which is opposite to the solid electrolyte body 11 side. Heating member (heaters) 151 are formed in the heater substrate 15. The heating members 151 are configured to generate heat energy when receiving electric power in order to increase a temperature of the gas sensor element 1 to its activation temperature.

As shown in FIG. 2, an insulation layer 16 made of alumina is formed at the electrode 12 side of the measuring target gas on the solid electrolyte body 11. The insulation layer 16 has an opening part 161. Further, a porous diffusion resistance layer 17 is formed on the surface of the insulation layer 16, which is opposite to the surface of the insulation layer 16 on which the solid electrolyte body 11 is formed. The porous diffusion resistance layer 17 is made of a porous alumina body through which the measuring target gas passes.

A measuring target gas chamber 169 is formed in an area which is covered with the solid electrolyte body 11, the insulation layer 16 and the porous diffusion resistance layer 17. The measuring target gas chamber 169 is configured to introduce the measuring target gas which has passed through the porous diffusion resistance layer 17. A shielding layer 18 is formed on the porous diffusion resistance layer 17, which is opposite to the insulation layer 16 side.

It is acceptable to form a catalyst layer and/or a poisoning trap layer, etc., which is not omitted from the drawings, on an outer surface 171 of the diffusion resistance layer 17. The catalyst layer has supporting particles made of alumina and noble metal catalyst particles such as Pt, Pd and Rh, etc. The catalyst layer is capable of performing combustion of hydrogen gas contained in the measuring target gas. The poisoning trap layer captures poisoning components contained in the measuring target gas.

Next, a description will now be given of the explanation of the electrodes (the electrode 12 at the measuring target gas side, and the electrode 13 at the reference gas side). The first exemplary embodiment will explain the electrode 12 at the measuring target gas side. Because the electrode 13 at the reference gas side is made of the same material of the electrode 12 at the measuring target gas side, the explanation of the electrode 13 is omitted.

Figure 3:
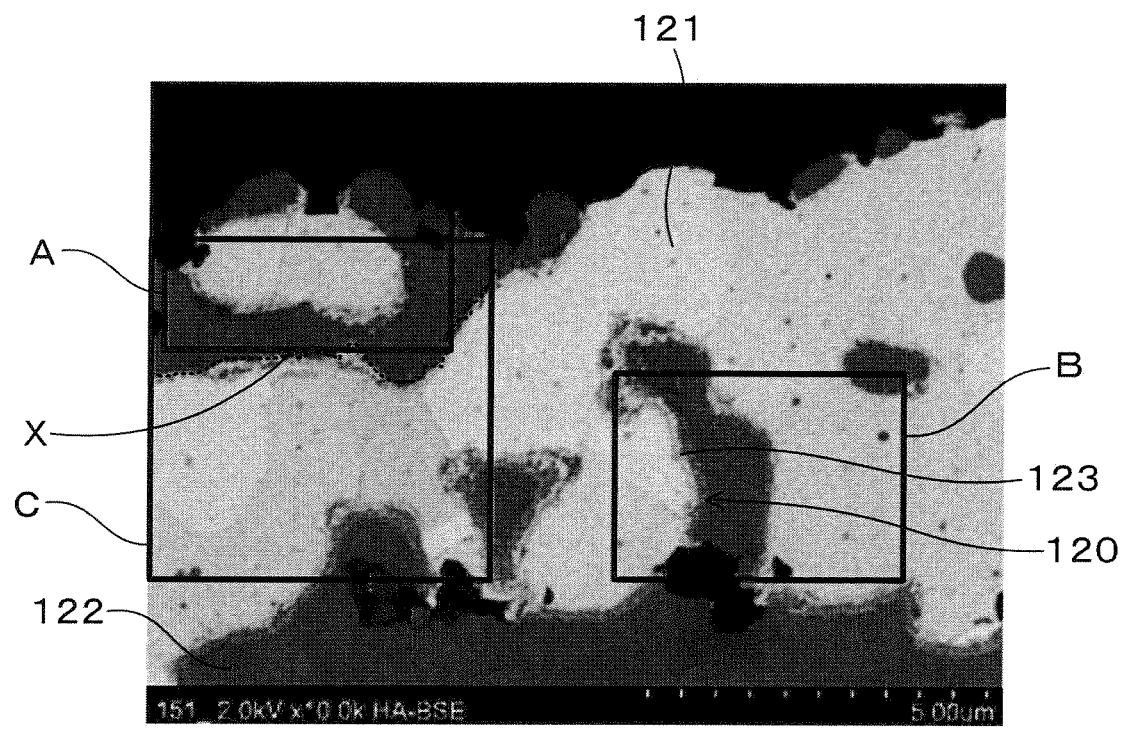
FIG. 3 is an SEM photograph showing a cross-sectional surface of an electrode (which is the electrode at a measuring target gas side) for use in the gas sensor according to the first exemplary embodiment.
Figure 4:
FIG. 4 is an SEM photograph showing an enlarged part A shown in FIG. 3 according to the first exemplary embodiment.
Figure 5:
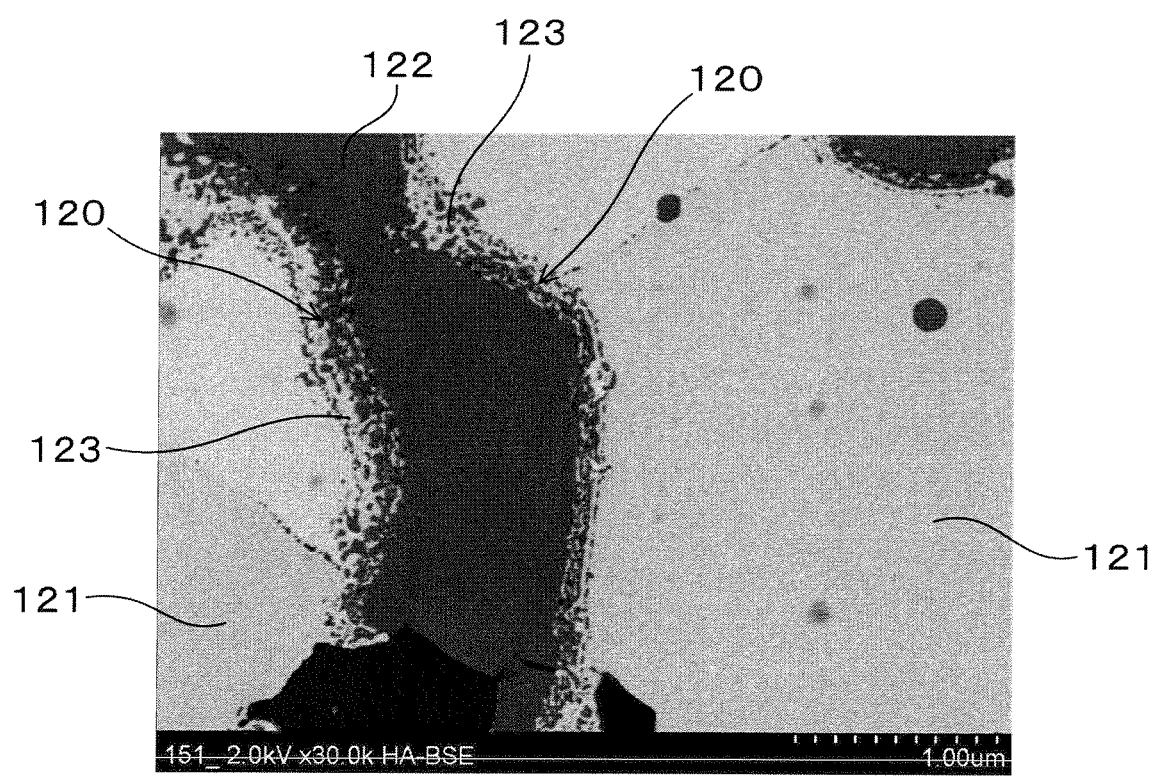
FIG. 5 is an SEM photograph showing an enlarged part B shown in FIG. 3 according to the first exemplary embodiment.

As shown in FIG. 3 to FIG. 5, the electrode (electrode 12 at the measuring target gas side) according to the first exemplary embodiment contains noble metal and the solid electrolyte. When a cross-sectional surface of the electrode 12 is observed, the electrode 12 has the noble metal part 121 made of noble metal, the solid electrolyte part 122 made of solid electrolyte, and the mixture part 123 made of the noble metal and the solid electrolyte. The mixture part 123 is present, i.e. formed along an interface part 120 between the noble metal part 121 and the solid electrolyte part 122. Hereinafter, a description will now be given of this structure in detail.

As shown in FIG. 3 to FIG. 5, a cross-sectional surface of the electrode 12 at the measuring target gas side was observed by using a scanning electron microscope (SEM) (S-5500, manufactured by Hitachi High-Technologies Corporation). It can be observed that the electrode 12 has the noble metal part 121 (designated by a white color part in the drawings), the solid electrolyte part 122 (designated by a gray color part in the drawings) made of solid electrolyte, and the mixture part 123 (designated by a mixture part of white color and gray color in the drawings). FIG. 4 and FIG. 5 show the part (Magnification: 30000 times) designated by reference character A, and the part (Magnification: 30000 times) designated by reference character B shown in FIG. 3 (Magnification: 10000 times).

As shown in FIG. 3, the noble metal part 121 is made of platinum (Pt). The solid electrolyte part 122 is made of yttria-stabilized zirconia (YSZ) as solid electrolyte having an oxygen ion conductivity. The mixture part 123 is formed along an interface part 120 as the interface between the noble metal part 121 and the solid electrolyte part 122. The mixture part 123, the noble metal (Pt) and the solid electrolyte (YSZ) are mixed and in contact with each other in nano-scale structure. Further, in the mixture part, at least a part of the noble metal or the solid electrolyte is continuously in contact with micro-scale noble metal (in the noble metal part) or micro-scale solid electrolyte (in the solid electrolyte part) to form a continuous phase (Pt/YSZ bicontinuous nano-scale structure to be referred by the first exemplary embodiment). In more detail, a case in which the noble metal and the solid electrolyte are mixed and in contact with each other in a three-dimensional nano-scale is as follows. When a cross-sectional surface of the mixture part is observed, the noble metal and the solid electrolyte are not separated from each other, for example, in a circle area having a diameter of 200 nm by a continuous curve.

Still further, when a cross-sectional surface of the electrode 12 at the measuring target gas side is observed, at least a 5 μm×5 μm square C in the mixture part 123 is present (see FIG. 3) along the overall interface part 120 between the noble metal part 121 and the solid electrolyte part 122. That is, when a cross-sectional surface of the electrode 12 at the measuring target gas side is observed, at least a 5 μm×5 μm square C (5 μm four sides of a square), in which the mixture part 123 is formed along the overall area of the interface part 120 between the noble metal part 121 and the solid electrolyte part 122, is always present in the electrode. The mixture part 123 which is continuously formed along the interface part 120 in the 5 μm square C is designated by the dotted line X shown in FIG. 3.

In addition, when a cross-sectional surface of the electrode 12 at the measuring target gas side is observed, at least one of the noble metal part 121 and the solid electrolyte part 122 is present (see FIG. 6) in a circle area D having a diameter of 1 μm which contains the mixture part 123. That is, when a cross-sectional surface of the electrode 12 at the measuring target gas side is observed, there is no circle area D having a diameter of 1 μm which is made only of the mixture part 123 in the electrode.

Further, the mixture part 123 has a maximum width which is not more than 50 times of a minimum width thereof. In the first exemplary embodiment, the mixture part 123 has a maximum width of 0.793 μm, and a minimum width of 0.09 μm. Accordingly, the maximum width of the mixture part 123 is not more than 9 times of the minimum width. A width of the mixture part 123 was detected at ten measuring points in the area designated by the SEM photograph shown in FIG. 3. The maximum value and the minimum values in the measured widths at the ten measuring points are determined as the maximum width and the minimum width of the mixture part 123.

Figure 6:
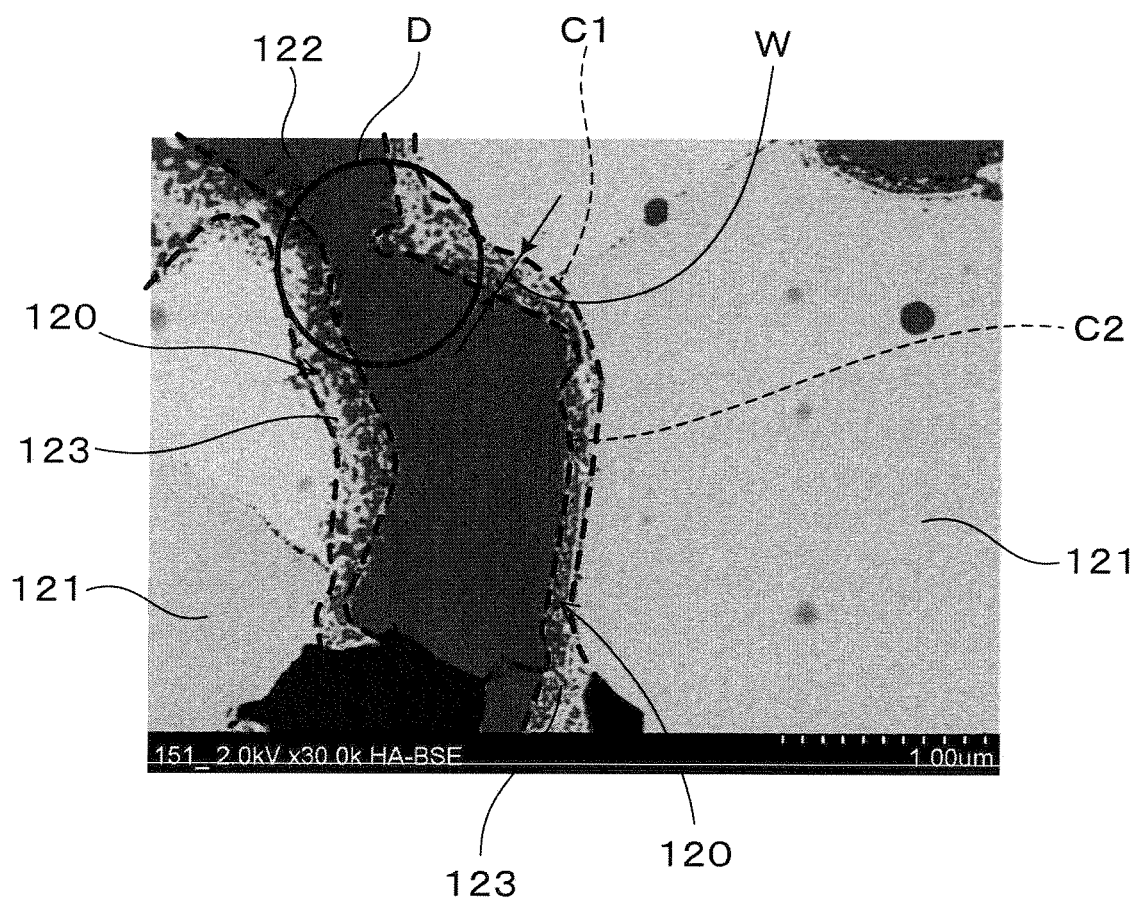
FIG. 6 is an SEM photograph showing a width of the mixture part according to the first exemplary embodiment.
Figure 7:
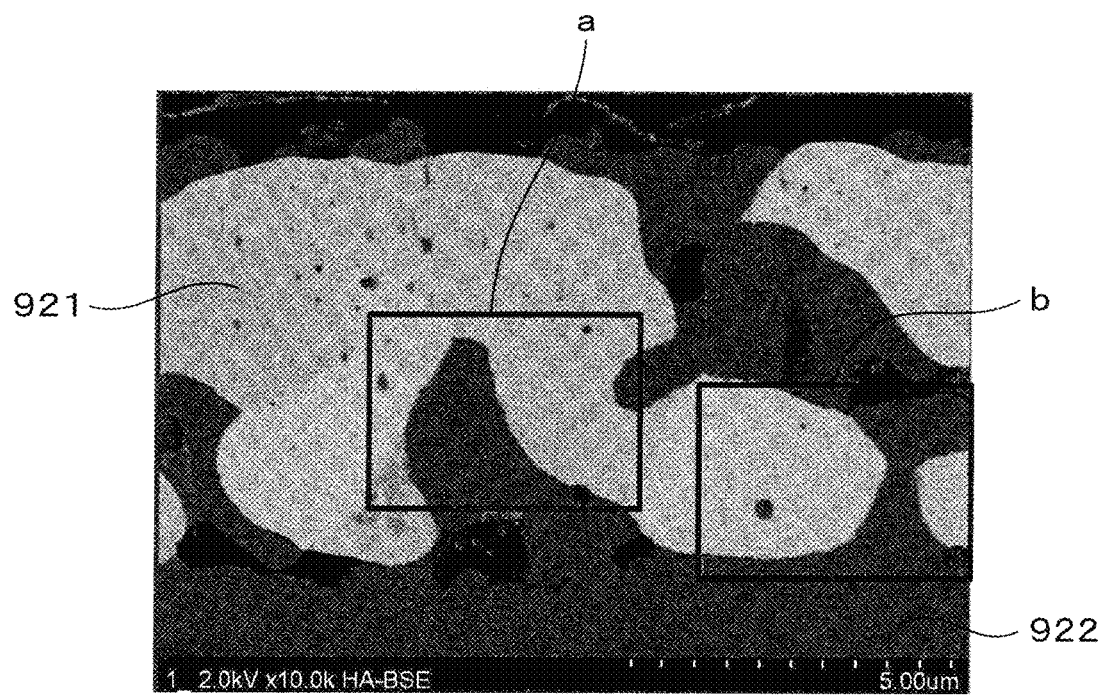
FIG. 7 is an SEM photograph showing a cross-sectional area of an electrode for use in a gas sensor according to a background art.
Figure 8:
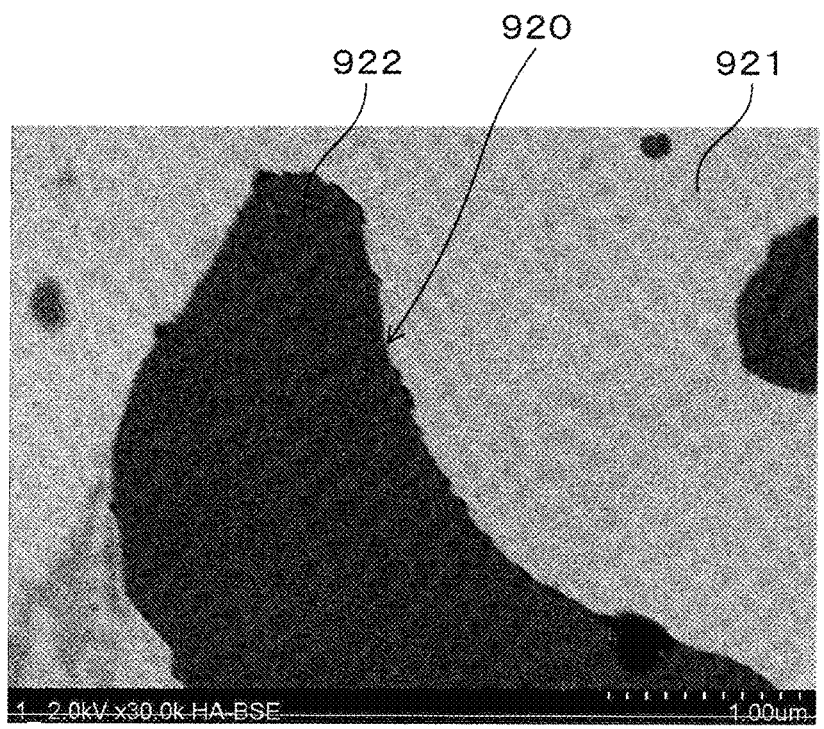
FIG. 8 is an SEM photograph showing an enlarged part a shown in FIG. 7 according to the background art.
Figure 9:
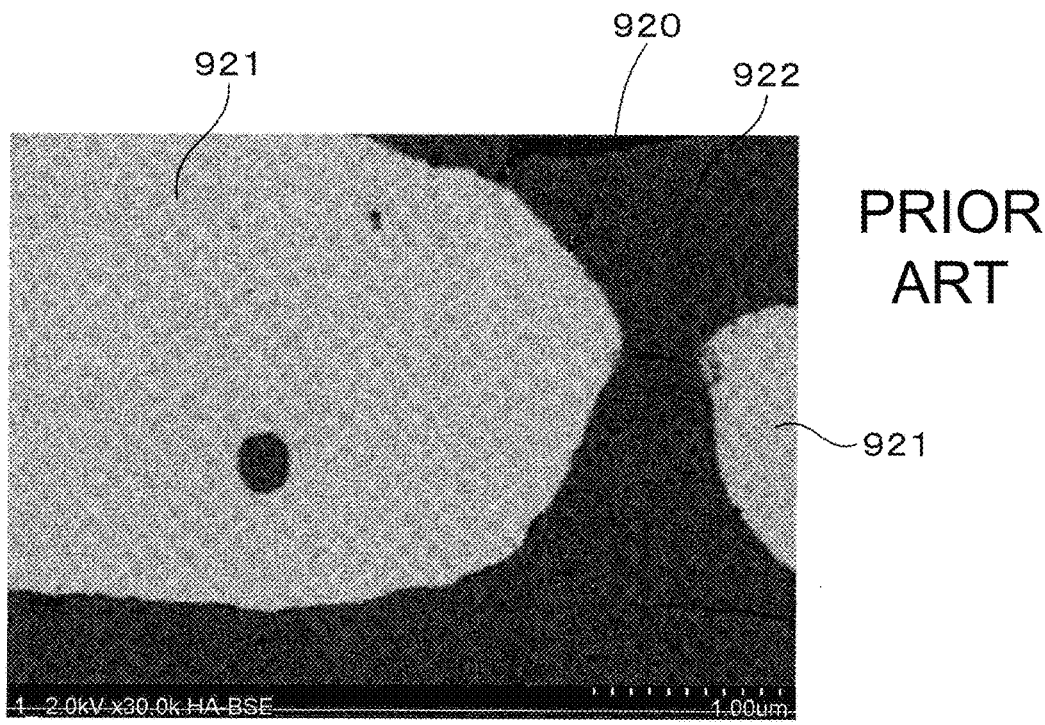
FIG. 9 is an SEM photograph showing an enlarged part b shown in FIG. 7 according to the background art.

A description will now be given of the width of the mixture part 123 with reference to FIG. 6. FIG. 6 shows an SEM photograph, like the SEM photograph shown in FIG. 5. As shown in FIG. 6, the line C1 designates the interface between the noble part 121 and the area (the mixture part 123) which forms the Pt/YSZ bicontinuous nano-scale structure, and the line C2 designates the interface between the solid electrolyte part 122 and the area (the mixture part 123) which forms the Pt/YSZ bicontinuous nano-scale structure. A width between the line C1 and the line C2 is used as the width W of the mixture part 123 which is the width of the area forming the Pt/YSZ bicontinuous nano-scale structure. In other words, the width W of the mixture part is indicated by a length of a minimum length line from an optional point on the interface line between the noble metal part 121 and the mixture part 123 toward the interface line between the solid electrolyte part 122 and the mixture part 123.

Next, a brief description will be given of a method of producing the gas sensor element 1 according to the first exemplary embodiment. First, a green sheet is prepared in order to form the solid electrolyte body 11. Specifically, yttria partially stabilized zirconia ($ZrO_2$-6 mol % $Y_2O_3$) powder, α-alumina ($Al_2O_3$) powder, organic binder, organic solvent, etc. are mixed in a ball mill in order to obtain slurry. The yttria partially stabilized zirconia ($ZrO_2$-6 mol % $Y_2O_3$) powder is a mixture of zirconia ($ZrO_2$) powder and yttria ($Y_2O_3$) powder to have molar ratio of 94:6. A green sheet of the solid electrolyte body is produced from the obtained slurry by using the doctor blade method.

Next, electrode paste is produced in order to form the electrode 12 at the measuring target gas side and the electrode 13 at the reference gas side. The electrode paste is applied on the green sheet of the solid electrolyte body. Specifically, Zr and Y are uniformly adhered to $ZrO_2$-6 mol % $Y_2O_3$ powder to produce a powder having a molar ratio (Zr:y) within a range of 1:0.1~0.115. That is, a Nd-YAG laser device is used as a laser beam source, a lens having a focus length of 100 mm is used as a condensing lens, and a vacuum vessel (made of stainless steel, volume of 350 cc) with a quartz window is used as a treatment vessel. Further, Zr plate and Y plate are used as a target (to arrange the Zr plate and the Y plate having a molar ratio within a range of 1:0.1 to 0.15 (Zr:Y). The $ZrO_2$-6 mol % $Y_2O_3$ powder of 50 cc is used. A stepping motor is used as a revolution means. First of all, a chamber and the treatment vessel have a vacuum of $4 \times 10^{-3}$ Torr. Next, a Nd-YAG laser device irradiates a laser beam to the treatment vessel while rotating the treatment vessel at a revolution speed of 1 revolution/minute. Further, the Nd-YAG laser device irradiates a pulse laser beam (wavelength: 532 nm, energy: 0.92 J/shot, pulse width: 7 ns) having a diameter of 2 nm to the target by using the condensing lens so that diffusion particles adhere to $ZrO_2$-6 mol % $Y_2O_3$ powder. This makes it possible to produce the powder in which Zr and Y having a molar ratio (Zr:Y) within a range of 1:0.1 to 0.15 uniformly adhere to the powder. After this, Pt powder of 90 wt % is added to the obtained powder of 10 wt %, and these powders are mixed. The obtained mixture powder is fired at a temperature within a range of 800 to 1000° C. in a hydrogen atmosphere in order to produce the powder (PT-Zr—Y powder) in which Pt—Zr—Y is formed only at the interface between $ZrO_2$-6 mol % $Y_2O_3$ and Pt. The obtained powder, the organic binder, organic solvent, etc. are mixed to produce electrode paste. After this, the electrode paste is applied on the green sheet of the solid electrolyte body by using a screen printing method.

Next, in addition to the green sheet of the solid electrolyte body on which the electrode paste has been painted, various green sheets are laminated to produce an intermediate lamination body in order to form the reference gas chamber formation layer 14, the heater substrate 15, the insulation layer 16, the porous diffusion resistance layer 17, the shielding layer 18, etc. The intermediate lamination body is fired at a temperature of 1450° C. to produce the gas sensor element 1 shown in FIG. 2. The electrode 12 at the measuring target gas side and the electrode 13 at the reference gas side have a structure shown in FIG. 3 to FIG. 5 in which a phase separation of Pt and YSZ is formed in the PT-Zr—Y at the interface between Pt and YSZ. The concept of the first exemplary embodiment is not limited by the formation method of forming the electrode 12 at the measuring target gas side and the electrode 13 at the reference gas side previously described.

Next, a description will be given of the action and effects of the electrodes (electrode 12 at the measuring target gas side and the electrode 13 at the reference gas side) for use in a gas sensor and the gas sensor equipped with the electrodes. The action and effects of the electrode 12 will be explained. The electrode 13 at the reference gas side has the same action and effects of the electrode 12 at the measuring target gas side.

The electrode (the electrode 12 at the measuring target gas side) in the gas sensor element 1 according to the first exemplary embodiment contains noble metal (Pt) and solid electrolyte (YSZ) having oxygen ion conductivity. When a cross-sectional surface of the electrode is observed, the electrode (the electrode 12 at the measuring target gas side) has the noble metal 121 made of noble metal (Pt) and the solid electrolyte 122 made of solid electrolyte (YSZ) and the mixture part 123 in which the noble metal (Pt) and the solid electrolyte (YSZ) are mixed. That is, because the electrode (the electrode 12 at the measuring target gas side) has the mixture part 123 in which the noble metal (Pt) and the solid electrolyte (YSZ) are mixed, it is possible to adequately increase a three phase interface of the noble metal part (noble metal: Pt), the solid electrolyte part (solid electrolyte: YSZ) and a measuring target gas (vapor phase).

Accordingly, it is thereby possible to increase the number of reaction points where molecules (oxygen molecules) in the measuring target gas are converted to ions (oxygen ions). That is, this makes it possible to enhance the efficiency of converting molecules (oxygen molecules) contained in the measuring target gas to ions (oxygen ions). This makes it possible to reduce an electrode resistance (electrode interface resistance), and suppress variation of a sensor output (limiting current value IL) and to provide a stable sensor output.

In addition, the mixture part 123 in the electrode (the electrode 12 at the measuring target gas side) is presence along the interface part 120 between the noble metal part 121 and the solid electrolyte part 122. This makes it possible to suppress variation of the electrode resistance, and further suppress variation of a sensor resistance. It is thereby possible to further suppress variation of a sensor output, and to reliably provide a stable sensor output.

When a cross-sectional surface of the electrode (the electrode 12 at the measuring target gas side) is observed, at least a 5 μm×5 nm square C, in which the mixture part 123 is formed along the overall area of the interface part 120 between the noble metal part 121 and the solid electrolyte part 122, is present in the electrode 12 (the electrode 12 at the measuring target gas side). This makes it possible to further suppress variation of an electrode resistance and variation of a sensor resistance. It is thereby possible to further suppress variation of a sensor output, and provide a stable sensor output.

The mixture part 123 in the electrode (the electrode 12 at the measuring target gas side) has a maximum width which is not more than 50 times (not more than 9 times in the first exemplary embodiment) of a minimum width thereof. This structure makes it possible to suppress variation of the width of the mixture part 123. That is, it is possible to form the mixture part 123 more uniformly in the interface section 120 between the noble metal part 121 and the solid electrolyte part 122. This makes it possible to suppress variation of an electrode resistance, and further suppress variation of a sensor resistance, and provide a stable sensor output.

When a cross-sectional surface of the electrode (the electrode 12 at the measuring target gas side) is observed, at least one of the noble metal part 121 and the solid electrolyte part 122 is present in a circle area having a diameter of 1 μm which contains the mixture part 123. This makes it possible to reduce the electrode capacitance, and enhance the response to the target gas. Because of enhancing the response to the target gas, it is possible to increase the detection accuracy of detecting imbalance between cylinders of an internal combustion engine, for example.

According to the first exemplary embodiment, as previously described, it is possible to provide the electrode (the electrode 12 at the measuring target gas side and the electrode 13 at the reference gas side) for use in a gas sensor capable of outputting a stable sensor output, and the gas sensor element 1 using the electrode.

Second Exemplary Embodiment

The second exemplary embodiment shows an example of evaluating a relationship between a mixture part formation state and a gas sensor performance. In the second exemplary embodiment, the same reference characters and numbers used in the first exemplary embodiment indicate the same components shown by the first exemplary embodiment. The explanation of the same components is omitted here.

A relationship will be evaluated between the range of the mixture part 123 which is continuously formed in the interface part, the sensor resistance and the sensor output. Specifically, a plurality of electrode pastes was prepared by changing production condition of PT-Zr—Y powder shown in the first exemplary embodiment. Next, a plurality of gas sensor elements 1 was produced. The gas sensor elements 1 had different ranges of the mixture part 123 (see FIG. 6).

More specifically, when a cross-sectional surface of the electrode 12 of each of the gas sensor elements 1 was observed, the mixture part 123 formed along the overall area of the interface part 120 between the noble metal part 121 and the solid electrolyte part 122 is within:

less than 3 μm×3 μm square, a range of not less than 3 μm×3 μm square and less than 5 μm×5 μm square, a range of not less than 5 μm×5 μm square and less than 8 μm×8 μm square, and a range of not less than 8 μm×8 μm square and less than 10 μm×10 μm square, respectively.

The electrode 12 having the mixture part 123, which has an area within a range of not less than 5 μm×5 μm square and less than 8 μm×8 μm square, formed in the overall area of the interface part 120 indicates the electrode having the mixture part 123, which is continuously formed along the interface part 120 and its maximum area is within a range of not less than 5 μm×5 μm square and less than 8 μm×8 μm square (see FIG. 3). The range of each of the other areas is determined by the same procedure. By the way. FIG. 3 is the SEM photograph showing the mixture range 123 within a range of not less than 5 μm×5 μm square and less than 8 μm×8 μm square.

Figure 10:
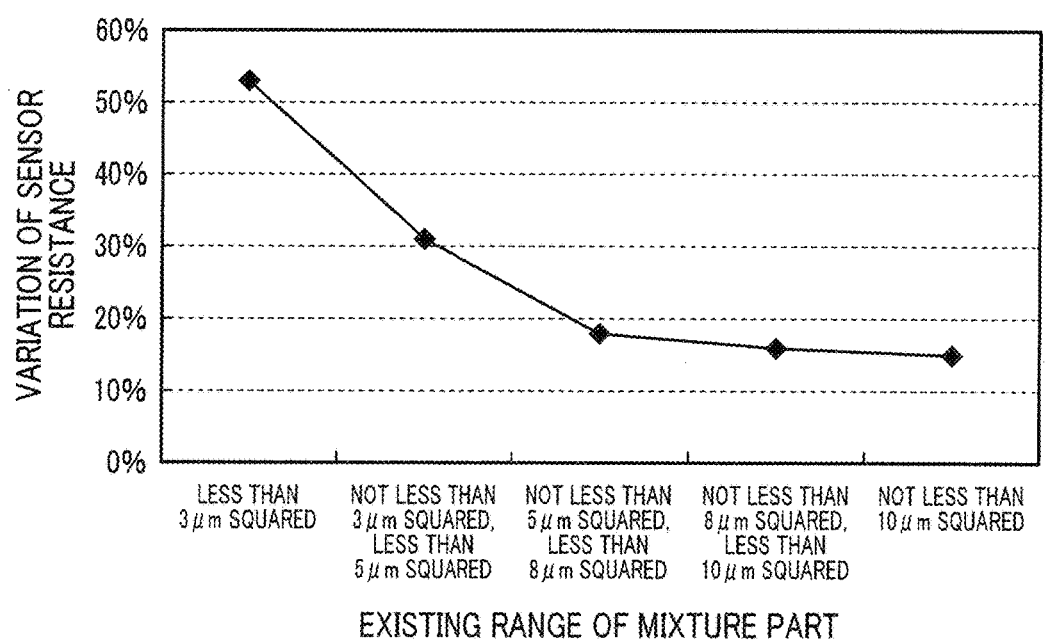
FIG. 10 is a view showing a relationship between an area of the mixture part of the electrode for use in a gas sensor and variation of a sensor resistance, according to a second exemplary embodiment.
Figure 11:
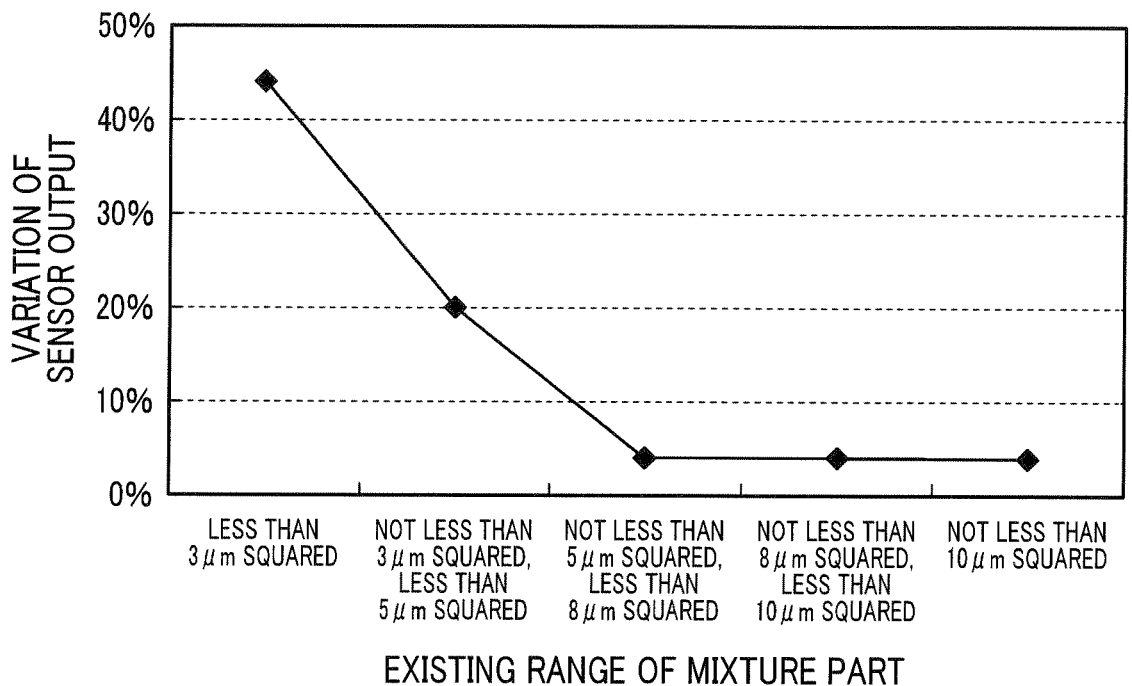
FIG. 11 is a view showing a relationship between the area of the mixture part of the electrode for use in a gas sensor and variation of a sensor output, according to a second exemplary embodiment.

Next, gas sensors 2 having the same structure of the gas sensor according to the first exemplary embodiment were produced, which have different ranges of the mixture part 123 in the electrode 12. A sensor resistance and a sensor output of each of the gas sensors 2 was detected, and variation of these detected values was measured. Specifically, a V-I waveform of each gas sensor 2 was detected after a temperature of the gas sensor 2 is increased to and maintained at a temperature of 700° C. A current value was obtained at a predetermined voltage (0.05 V) on the basis of the V-I waveform, and a sensor resistance was calculated. Further, a current value (sensor output: mA) at a predetermined voltage value (0.5 V) on the basis of the V-I waveform. The sensor resistance and the sensor output of each of the thirty gas sensors 2 was obtained, and variations of them were obtained on the basis of a standard deviation/average value of them. FIG. 10 and FIG. 11 shows the calculation results.

As can be understood from the results shown in FIG. 10 and FIG. 11, it is possible to suppress variation of each of the sensor resistance and the sensor output when the mixture part is not less than 5 μm×5 μm square. Accordingly, when a cross-sectional surface of the electrode 12, it can be understood that it is preferable for the mixture part inside a 5 μm×5 μm square C to be formed along the overall interface part 120 between the noble metal part 121 and the solid electrolyte part 122 (see FIG. 3).

Next, a description will now be given of a relationship between a width of the mixture part 123 and variation of a sensor resistance and a sensor output. Specifically, a plurality of electrode pastes were prepared by changing production conditions of Pt—Zr—Y powder used in the first exemplary embodiment. Next, a plurality of the gas sensor elements 1 having different widths were produced by using these electrode pastes (see FIG. 6). More specifically, the gas sensor elements 1 were equipped with the electrode 12 of different width ratios (maximum width/minimum width) of the maximum width to the minimum width of the mixture part 123, where the different width ratios were 20, 25, 50, 100, 130 and 150, respectively. The first exemplary embodiment has shown the measuring method of measuring the width ratio of the mixture part.

Figure 12:
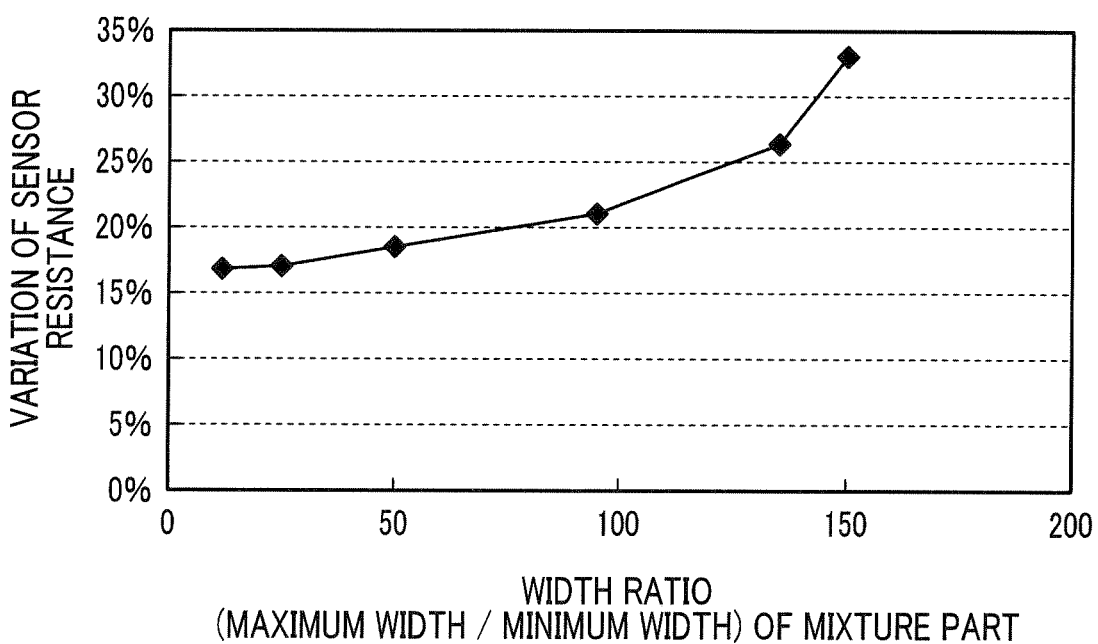
FIG. 12 is a view showing a relationship between a width ratio of the mixture part of the electrode for use in a gas sensor and variation of a sensor resistance, according to the second exemplary embodiment.
Figure 13:
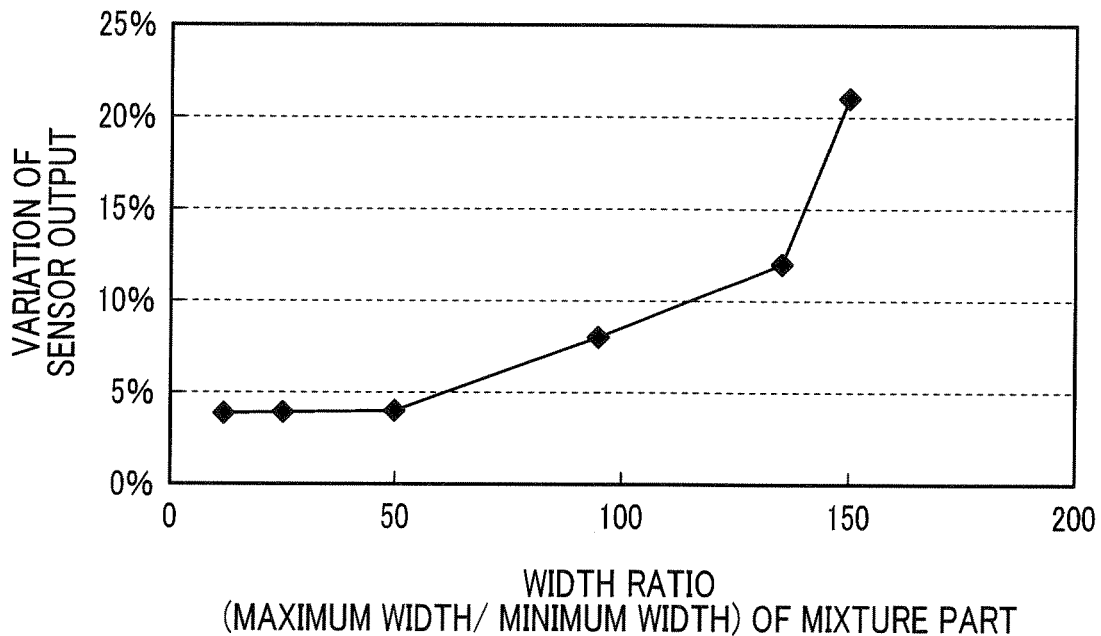
FIG. 13 is a view showing a relationship between the width ratio of the mixture part of the electrode for use in a gas sensor and variation of a sensor output, according to the second exemplary embodiment.

Next, the gas sensors 2 equipped with each of these gas sensor elements 1 were produced, where the gas sensors 2 had the same structure of the gas sensor 2 according to the first exemplary embodiment. Variation of the sensor resistance and variation of the sensor output of each of the gas sensors 2 were detected. The detection method of detecting the variation of the sensor resistance and the variation of the sensor output is the same method previously described. FIG. 12 and FIG. 13 show these detection results.

As can be known from FIG. 12 and FIG. 13, it is possible to further suppress variation of the sensor resistance and variation of the sensor output when the width ratio of maximum width to the minimum width is not more than 50 times. Accordingly, it can be understood that it is preferable for the mixture part 123 to have the maximum width which is not more than 50 times of the minimum width of the mixture part 123 (see FIG. 6).

Next, a relationship between the presence ratio of the mixture part 123 per predetermined area, an electrode capacitance of the gas sensor and the detection accuracy of imbalance between cylinders is evaluated. Specifically, a plurality of the gas sensor elements 1 having different widths of the mixture part 123 were produced by using a plurality of the electrode pastes made by changing the production condition of Pt—Zr—Y powder (see FIG. 6). A cross-sectional surface of the electrode 12 of each of the gas sensor elements 1 was observed to measure a maximum value of the presence ratio (area ratio: %) of the mixture part 123 in the circle area D having the diameter of 1 μm. Thus, the gas sensor elements 1 having different presence ratios (maximum value) of the mixture part in the circle area D having the diameter of 1 μm were produced.

Figure 14:
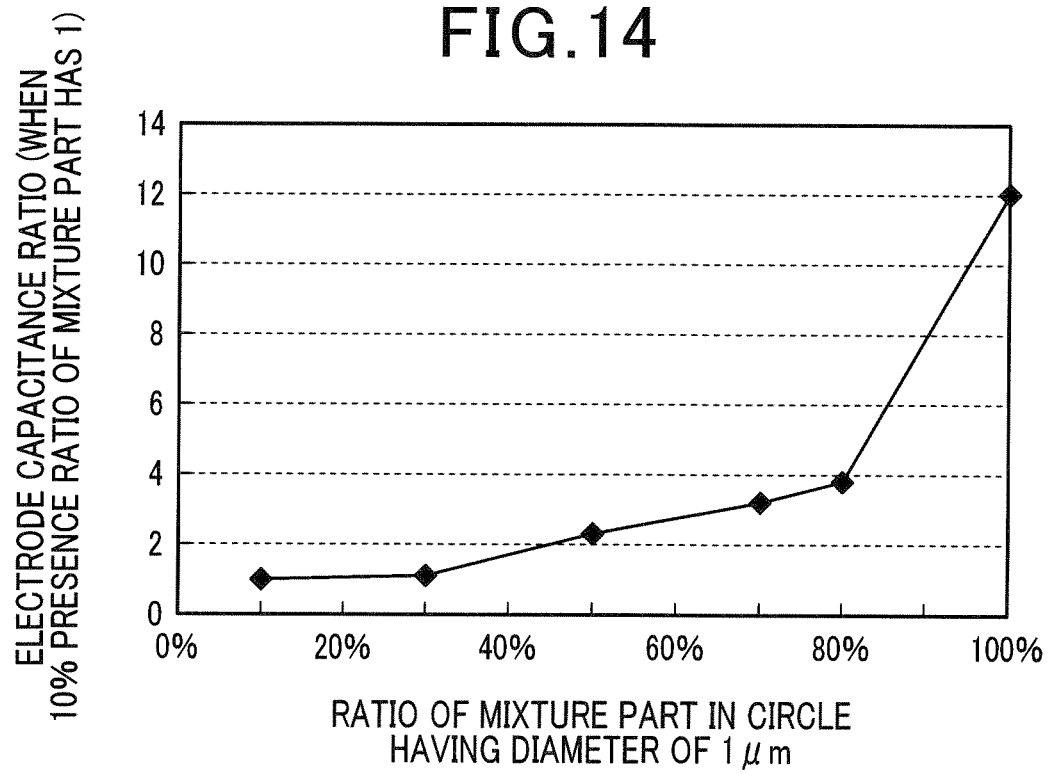
FIG. 14 is a view showing a relationship between a presence ratio of the mixture part in a circle area having a diameter of 1 μm in the electrode for use in a gas sensor and an electrode capacitance ratio, according to the second exemplary embodiment.

Next, the gas sensors 2 equipped with these gas sensor elements 1 were produced, which had the same structure of the gas sensor according to the first exemplary embodiment. Each of the gas sensors 2 was heated at a temperature of 700° C., and a complex impedance of each of the gas sensors 2 was detected using atmosphere. The complex impedance of the gas sensors 2 was detected by using a measuring device manufactured by Solartron (Solartron company) under the conditions, frequency: 0.1 Hz~51 kHz, applied voltage amplitude: 50 mV, and offset voltage: 0 V. The electrode capacitance of each of the gas sensors was detected on the basis of the obtained Cole-Cole plot. FIG. 14 shows a relationship between the electrode capacitance ratio and the presence ratio of the mixture part 123 when an electrode capacitance is determined as a value of 1, when the mixture part 123 in the circle area D having the 1 μm diameter is the presence rate of 10%.

Figure 15:
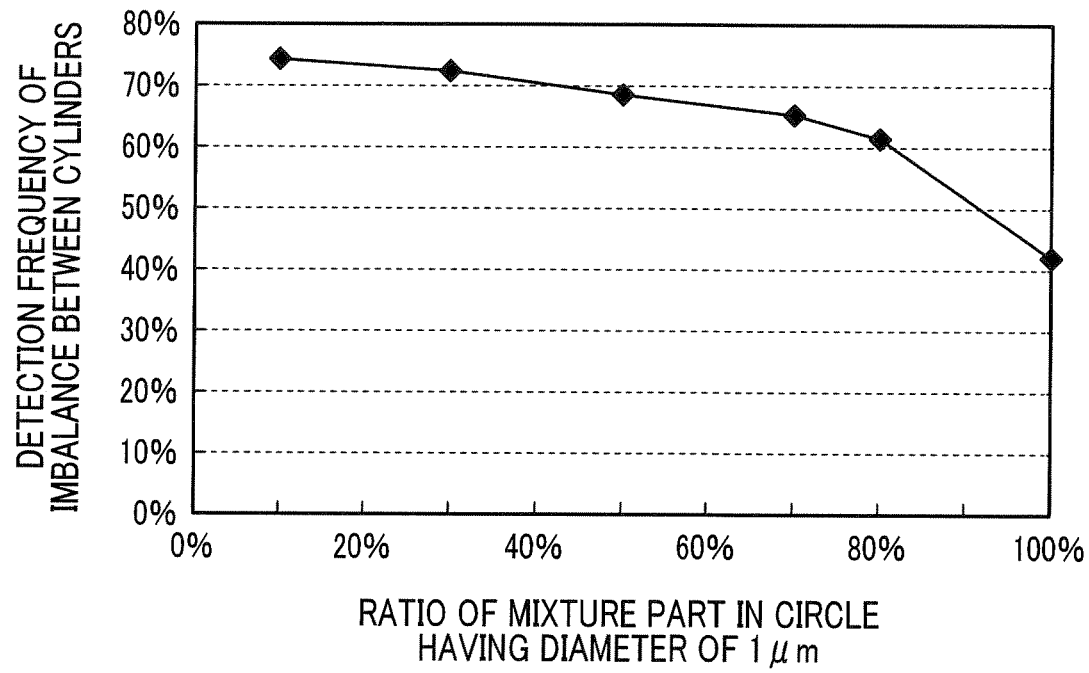
FIG. 15 is a view showing a relationship between a presence ratio of the mixture part in the circle area having a diameter of 1 μm in the electrode for use in a gas sensor and a detection accuracy of imbalance between cylinders, according to the second exemplary embodiment.

In addition, a detection accuracy of imbalance between cylinders was detected by using a plurality of the gas sensors 2 having different presence ratios of the mixture part in the electrode 12, previously described. Specifically, a sensor output of each of the gas sensors 2 was detected with time while exhaust gas as a model gas was supplied at 20 msec (ms) interval. More specifically, a model gas ($CH_3O_8$: 3 ml/min, $O_2$: 63 ml/min, $N_2$: 2904 ml/min) having an air/fuel ratio (A/F: Air/Fuel) of 13 was supplied once per 5 ms. Next, another model gas ($O_2$: 22 ml/min, $N_2$: 2978 ml/min) having an air/fuel ratio (A/F: Air/Fuel) of 15 was supplied three times per 5 ms. These model gases supplied for a sum of 20 ms is one period. A plurality of the periods was performed to detect the sensor output in time. An amplitude $V_1$ of the sensor output was used as the imbalance between cylinders. A ratio (percentage: %) of the amplitude $V_1$ (measurement value) of the sensor output to an amplitude $V_0$ (theoretical value) of a theoretical sensor output was calculated to obtain the detection accuracy of imbalance between the cylinders. FIG. 15 shows its results.

As can be known in FIG. 14, it is possible to reduce the electrode capacitance ratio when the presence ratio of the mixture part 123 in the circle area D having the 1 μm diameter. Further, as can be known in FIG. 15, it is possible to enhance the detection accuracy of imbalance between cylinders when the presence ratio of the mixture part 123 is reduced. Accordingly, when a cross-sectional surface of the electrode 12 for use in a gas sensor is observed, it can be understood that it is preferable to form at least one of the noble metal part 121 and the solid electrolyte part 122 in the circle area D (see FIG. 6), which contains the mixture part 123, having the 1 μm diameter. Still further, as can be known from FIG. 14 and FIG. 15, it is preferable for the presence ratio of the mixture part 123 in the circle area D having the 1 μm diameter to have a maximum value within a range of not more than 80%, and more preferable, not more than 50%, in views of more reducing the electrode capacitance and more enhancing the detection accuracy of imbalance between cylinders.

EXPLANATION OF REFERENCE NUMBERS

1 Gas sensor element, 11 Solid electrolyte body, 12 Electrode (electrode at measuring target gas side), 120 Interface part (interface between noble metal part and solid electrolyte part), 121 Noble metal part, 122 Solid electrolyte part, and 123 Mixture part.

The invention claimed is:

1. An electrode for use in a gas sensor equipped with a gas sensor element capable of detecting a concentration of a specific gas contained in a measuring target gas, the electrode being directly formed on a first solid electrolyte body having an oxygen ion conductivity arranged in the gas sensor element, the electrode comprising a noble metal and a second solid electrolyte, wherein a noble metal part is comprised of the noble metal, a solid electrolyte part is made of the second solid electrolyte, at least first and second mixture parts, each of which is made of the noble metal and the second solid electrolyte, in which the noble metal and the second solid electrolyte are mixed in contact with each other in a three-dimensional nano-scale structure, and each of the first and second mixture parts is formed along an interface part between the noble metal part and the solid electrolyte part, and the noble metal part, the solid electrolyte part, and the first and second mixture parts are formed in a cross-sectional surface of the electrode such that:

(i) each of the first and second mixture parts has a substantially circular arc shape;

(ii) a first surface of the noble metal part is surrounded by the first mixture part;

(iii) the first mixture part is surrounded by a first surface of the solid electrolyte part;

(iv) a second surface of the solid electrolyte part is surrounded by the second mixture part; and (v) the second mixture part is surrounded by a second surface of the noble metal part, and when a cross-sectional surface of the first and second mixture parts is observed, the noble metal and the second solid electrolyte within the cross-sectional surface of the first and second mixture parts are not divided from each other by a single continuous curve inside a circle area having a diameter of 200 nm.

2. The electrode for use in a gas sensor according to claim 1, wherein at least a part of the noble metal and the second solid electrolyte in the first and second mixture parts forms a continuous layer with micro-scale noble metal in the noble metal part or micro-scale solid electrolyte in the solid electrolyte part.

3. The electrode for use in a gas sensor according to claim 1, wherein the first and second mixture parts inside at least a 5 µm×5 µm square is formed in the interface part between the noble metal part and the solid electrolyte part in a cross-sectional surface of the electrode.

4. The electrode for use in a gas sensor according to claim 1, wherein the first and second mixture parts have a maximum width which is not more than 50 times of a minimum width of the first and second mixture parts.

5. The electrode for use in a gas sensor according to claim 1, wherein at least one of the noble metal part and the solid electrolyte part is formed in a circle area having a diameter of 1 µm which contains the first and second mixture parts in a cross-sectional surface of the electrode.

6. The electrode for use in a gas sensor according to claim 5, wherein a presence ratio of the first and second mixture parts in the circle area having the diameter of 1 µm which contains the first and second mixture parts is not more than 80%.

7. The electrode for use in a gas sensor according to claim 5, wherein a presence ratio of the first and second mixture parts in the circle area having the diameter of 1 µm which contains the first and second mixture parts is not more than 50%.

8. The electrode for use in a gas sensor according to claim 1, wherein the first solid electrolyte body has an oxygen ion conductivity.

9. The electrode for use in a gas sensor according to claim 1, wherein the noble metal is platinum, and the second solid electrolyte is yttria-stabilized zirconia.

10. The electrode for use in a gas sensor according to claim 1, wherein the first and second mixture parts having a maximum width of 0.793 µm and a minimum width of 0.09 µm.

11. The electrode for use in a gas sensor according to claim 1, wherein a maximum width of the first and second mixture parts is not more than 9 times of a minimum width of the first and second mixture parts.

12. A gas sensor element, comprising:
an electrode for use in a gas sensor equipped with the gas sensor element capable of detecting a concentration of a specific gas contained in a measuring target gas, the electrode being directly formed on a first solid electrolyte body having an oxygen ion conductivity arranged in the gas sensor element,
the electrode comprising a noble metal and a second solid electrolyte, wherein
a noble metal part is comprised of the noble metal,
a solid electrolyte part is made of the second solid electrolyte,
at least first and second mixture parts, each of which is made of the noble metal and the second solid electrolyte, in which the noble metal and the second solid electrolyte are mixed in contact with each other in a three-dimensional nano-scale structure, and each of the first and second mixture parts is formed along an interface part between the noble metal part and the solid electrolyte part, and
the noble metal part, the solid electrolyte part, and the first and second mixture parts are formed in a cross-sectional surface of the electrode such that:
(i) each of the first and second mixture parts has a substantially circular arc shape;
(ii) a first surface of the noble metal part is surrounded by the first mixture part;
(iii) the first mixture part is surrounded by a first surface of the solid electrolyte part;
(iv) a second surface of the solid electrolyte part is surrounded by the second mixture part; and
(v) the second mixture part is surrounded by a second surface of the noble metal part,
when a cross-sectional surface of the first and second mixture parts is observed, the noble metal and the second solid electrolyte within the cross-sectional surface of the first and second mixture parts are not divided from each other by a single continuous curve inside a circle area having a diameter of 200 nm,
the electrode is formed at a measuring target gas side on one surface of the first solid electrolyte body; and
a reference electrode formed at a reference gas side on an opposite surface of the first solid electrolyte body.

13. An electrode configured for use in a gas sensor equipped with a gas sensor element configured to detect a concentration of a specific gas contained in a measuring target gas, the electrode being directly formed on a first solid electrolyte body having an oxygen ion conductivity arranged in the gas sensor element,
the electrode comprising a noble metal and a second solid electrolyte, wherein
a noble metal part is comprised of the noble metal,
a solid electrolyte part is made of the second solid electrolyte,
a mixture part having at least a first portion and a second portion, each of the first portion and the second portion of the mixture part is made of the noble metal and the second solid electrolyte, in which the noble metal and the second solid electrolyte are mixed in contact with each other in a three-dimensional nano-scale structure, and each of the first portion and the second portion of the mixture part is formed along an interface part between the noble metal part and the solid electrolyte part, and
the noble metal part, the solid electrolyte part, and the first and second portions of the mixture part are formed in a cross-sectional surface of the electrode such that:
(i) each of the first and second portions of the mixture part has a substantially circular arc shape;
(ii) a first surface of the noble metal part is at least partially surrounded by the first portion of the mixture part;
(iii) the first portion of the mixture part is at least partially surrounded by a first surface of the solid electrolyte part;
(iv) a second surface of the solid electrolyte part is at least partially surrounded by the second portion of the mixture part; and
(v) the second portion of the mixture part is at least partially surrounded by a second surface of the noble metal part, and
when a cross-sectional surface of the mixture part is observed, the noble metal and the second solid electrolyte within the cross-sectional surface of the mixture part are not divided from each other by a single continuous curve inside a circle area having a diameter of 200 nm.

* * * * *